(12) United States Patent
Krishnan et al.

(10) Patent No.: US 10,601,629 B2
(45) Date of Patent: Mar. 24, 2020

(54) VIRTUAL LOOKUP TABLE FOR PROBABILISTIC CONSTELLATION SHAPING

(71) Applicant: Futurewei Technologies, Inc., Plano, TX (US)

(72) Inventors: Murali Krishnan, San Diego, CA (US); Yan Cui, Sunnyvale, CA (US); Yu Sheng Bai, Los Altos Hills, CA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 16/055,989

(22) Filed: Aug. 6, 2018

(65) Prior Publication Data
US 2019/0052509 A1    Feb. 14, 2019

Related U.S. Application Data

(60) Provisional application No. 62/543,139, filed on Aug. 9, 2017.

(51) Int. Cl.
*H04L 27/36*   (2006.01)
*H04L 1/00*    (2006.01)
*H04L 27/00*   (2006.01)

(52) U.S. Cl.
CPC .......... *H04L 27/362* (2013.01); *H04L 1/0042* (2013.01); *H04L 1/0043* (2013.01); *H04L 27/0008* (2013.01)

(58) Field of Classification Search
CPC ... H04L 27/362; H04L 1/0042; H04L 1/0043; H04L 27/0008

USPC .......................................................... 375/298
See application file for complete search history.

(56) References Cited

U.S. PATENT DOCUMENTS

| | | |
|---|---|---|
| 2010/0169722 A1 | 7/2010 | Wu et al. |
| 2012/0020435 A1 | 1/2012 | Xu et al. |
| 2012/0207241 A1 | 8/2012 | Wang et al. |
| 2013/0077718 A1* | 3/2013 | Chavali ................. H04L 5/0007 375/340 |
| 2018/0083716 A1* | 3/2018 | Cho ...................... H04B 7/0456 |

FOREIGN PATENT DOCUMENTS

WO    2013023599 A1    2/2013

OTHER PUBLICATIONS

Sterian, "The Constellation-Shaping Algorithm Using Closed-Form Expressions for the Number of Ring Combinations," IEEE Transactions on Communications, vol. 47, No. 10, Oct. 1999, pp. 1462-1465.

(Continued)

*Primary Examiner* — Michael R Neff
(74) *Attorney, Agent, or Firm* — Conley Rose, P.C.

(57) ABSTRACT

Probabilistic generation and decoding modulation symbols for use with optical communication. Codewords are generated using combinations of symbols from a modulation symbol alphabet, and each type of modulation symbol is sequentially generated using a hardware efficient combination generator that performs as a virtual lookup table (LUT). Likewise, decoding can be performed by sequentially identifying locations of individual modulation symbols within the received codeword.

19 Claims, 6 Drawing Sheets

(56) References Cited

OTHER PUBLICATIONS

Buchali, et al., "Rate Adaptation and Reach Increase by Probabilistically Shaped 64-QAM: An Experimental Demonstration," Journal of Lightwave Technology, vol. 34, No. 7, Apr. 1, 2016, pp. 1599-1609.
Böcherer et al, "High Throughput Probabilistic Shaping with Product Distribution Matching," arXiv:1702.07510 [cs.IT] (Feb. 24, 2017), 9 pages.
Machine Translation and Abstract of International Publication No. WO2013023599, Feb. 21, 2013, 23 pages.
Foreign Communication From a Counterpart Application, PCT Application No. PCT/CN2018/099193, English Translation of International Search Report dated Sep. 29, 2018, 9 pages.

\* cited by examiner

VIRTUAL LOOKUP TABLE FOR PROBABILISTIC CONSTELLATION SHAPING

CROSS-REFERENCE TO RELATED APPLICATIONS

This application is a non-provisional application that claims the benefit of U.S. Provisional Application No. 62/543,139, filed on Aug. 9, 2017, the disclosure of which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In today's rapidly evolving telecommunications infrastructure, optical communications systems fulfill one of the most important roles of very high speed and high bandwidth data transmission over both long and short distances (anywhere from a few hundreds of meters in datacenters to thousands of kilometers over transatlantic and submarine fibers). In order to meet the demands of high throughput over legacy installed fiber, sophisticated transmit and receive signal processing algorithms are constantly being introduced as potential solutions to be implemented in communications hardware.

In conventional modulation schemes, a "modulation symbol" represents a group of bits to be transmitted and is defined as a unique combination of phase shifts and power levels, and a "constellation" diagram represents the location (or "constellation point") of each modulation symbol in an x-y scatter diagram. The number of possible modulation symbols available for any given sampling instant is a function of the number of distinct phase shifts and power levels. The set of symbols for any given modulation scheme is sometimes called the "modulation symbol alphabet."

SUMMARY

The embodiments of this disclosure are directed at systems and methods for a virtual lookup table for probabilistic constellation shaping for use in data communications systems.

In an embodiment, the disclosure includes a method for probabilistic generation of modulation symbols implemented by processor circuitry. The method includes receiving, from an information source device, a plurality of bits having an arbitrary distribution, partitioning the plurality of bits into a plurality of bit sets based on a symbol length of a codeword and a modulation constellation defined by a modulation symbol alphabet, mapping a first bit set of the plurality of bit sets based on a first power symbol of the modulation symbol alphabet to produce a plurality of first modulation symbols, populating an output codeword at a plurality of first codeword locations with the plurality of first modulation symbols, mapping the second bit set of the plurality of bit sets based on a second power symbol of the modulation symbol alphabet to produce a plurality of second modulation symbols, populating a plurality of remaining codeword locations with the plurality of second modulation symbols, and providing the output codeword for transmission.

Optionally, in any of the preceding aspects, another implementation of the aspect provides that the symbol length for the codeword is based on a floor determination for each of a plurality of modulation-type sequences. Optionally, in any of the preceding aspects, another implementation of the aspect provides that the first power symbol is for a lower power modulation symbol and the second power symbol is for a higher power symbol relative to the lower-power modulation. Optionally, in any of the preceding aspects, another implementation of the aspect provides that the modulation symbols are real values and the codeword relates to an in-phase branch of an in-phase/quadrature modulator. Optionally, in any of the preceding aspects, another implementation of the aspect provides that the modulation symbols are real values and the codeword relates to a quadrature branch of an in-phase/quadrature modulator. Optionally, in any of the preceding aspects, another implementation of the aspect provides that the modulation symbols are complex values and the codeword relates to an in-phase branch and a quadrature branch of an in-phase/quadrature modulator. Optionally, in any of the preceding aspects, another implementation of the aspect provides that the plurality of bits are generated by an information source device.

In an embodiment, the disclosure includes an apparatus for a virtual lookup table for probabilistic generation of modulation symbols. The apparatus includes processor circuitry configured to receive, from an information source device, a plurality of bits having an arbitrary distribution, partition the plurality of bits into a plurality of bit sets based on a symbol length of a codeword and a modulation constellation defined by a modulation symbol alphabet, map a first bit set of the plurality of bit sets based on a first power symbol of the modulation symbol alphabet to produce a plurality of first modulation symbols, populate an output codeword at a plurality of first codeword locations with the plurality of first modulation symbols, map the second bit set of the plurality of bit sets based on a second power symbol of the modulation symbol alphabet to produce a plurality of second modulation symbols, populate a plurality of remaining codeword locations with the plurality of second modulation symbols, and provide the output codeword for transmission.

Optionally, in any of the preceding aspects, another implementation of the aspect provides that the symbol length for the codeword is based on a floor determination for each of a plurality of modulation-type sequences. Optionally, in any of the preceding aspects, another implementation of the aspect provides that the first power symbol is a lower power symbol, and the second power symbol is a higher-power symbol relative to the lower-power modulation. Optionally, in any of the preceding aspects, another implementation of the aspect provides that the modulation symbols are real values and the codeword relates to an in-phase branch of an in-phase/quadrature modulator. Optionally, in any of the preceding aspects, another implementation of the aspect provides that the modulation symbols are real values and the codeword relates to a quadrature branch of an in-phase/quadrature modulator. Optionally, in any of the preceding aspects, another implementation of the aspect provides that the modulation symbols are complex values and the codeword relates to an in-phase branch and a quadrature branch of an in-phase/quadrature modulator. Optionally, in any of the preceding aspects, another implementation of the aspect provides that the plurality of bits are provided by an information source device. Optionally, in any of the preceding aspects, another implementation of the aspect provides that the processor circuitry is further configured to provide the output codeword for transmission with forward error correction (FEC).

In an embodiment, the disclosure includes a method for decoding a block of modulation symbols. The method includes receiving a codeword, the codeword including a plurality of codeword locations populated by a plurality of modulation symbols based on a plurality of modulation symbol alphabets, determining a first plurality of codeword locations for a first plurality of modulation symbols based on a first one of a modulation symbol alphabet, determining a second plurality of codeword locations for a second plurality of modulation symbols based on a second one of the modulation symbol alphabet, and decoding the first plurality of modulation symbols and the second plurality of modulation symbols to produce a bit string.

Optionally, in any of the preceding aspects, another implementation of the aspect provides that the first one of the plurality of modulation symbol alphabets is for a lower-power symbol and the second one of the plurality of modulation symbols is for a higher-power symbol. Optionally, in any of the preceding aspects, another implementation of the aspect provides that the plurality of modulation symbols are real values and the codeword relates to an in-phase branch of an in-phase/quadrature modulator. Optionally, in any of the preceding aspects, another implementation of the aspect provides that the plurality of modulation symbols are real values and the codeword relates to a quadrature branch of an in-phase/quadrature modulator. Optionally, in any of the preceding aspects, another implementation of the aspect provides that the modulation symbols are complex values and the codeword relates to an in-phase branch and a quadrature branch of an in-phase/quadrature modulator.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
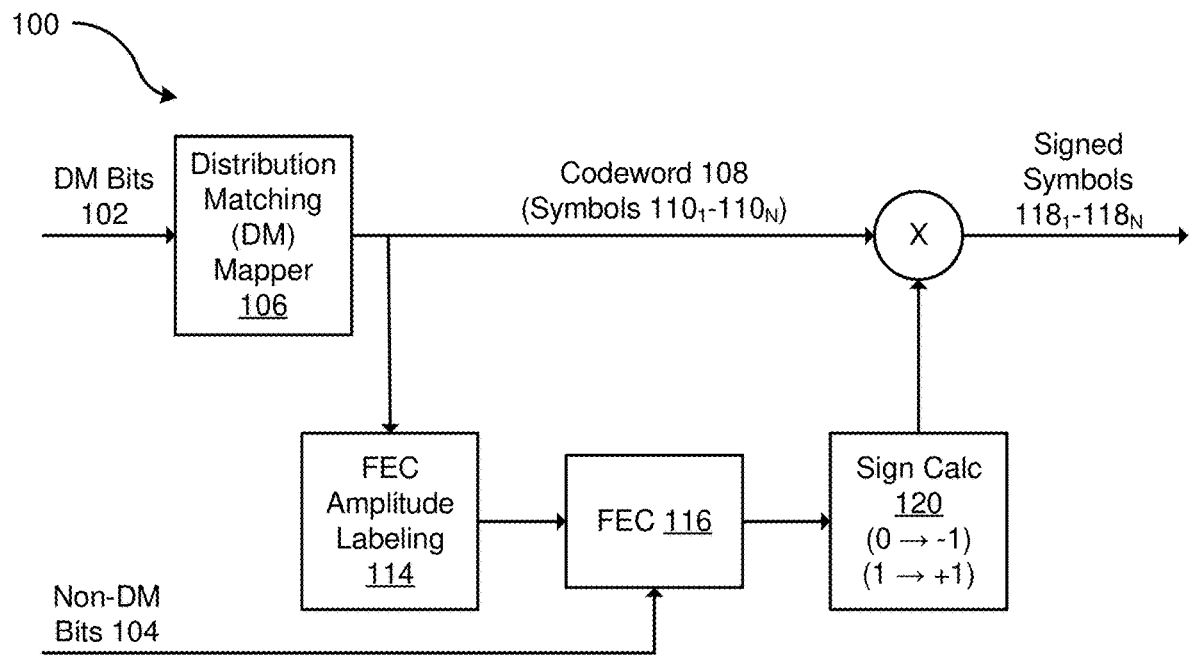
FIG. 1 shows a probabilistic constellation shaping architecture for an embodiment of the present disclosure.

A technique for avoiding problems associated with higher power symbols is through probabilistic constellation shaping (PCS). For example, symbols associated with a 64-QAM constellation are higher power symbols relative to symbols associated with a 16-QAM constellation. PCS can facilitate higher data rate transmission through probabilistic selection of modulation symbols from a modulation symbol alphabet of a Quadrature Amplitude Modulation (QAM) basis. As used herein, reference to "higher data rate" pertains to a realization of data rate transmissions of up to about 65 Tbit/s. Though higher power modulation rates can offer faster data rates and higher levels of spectral efficiency for the communications systems, they are considerably less resilient to noise and interference and are generally used sparingly except in favorable channel conditions. Reverting to a lower power modulation scheme brings the channel into a more reliable link with fewer data errors and re-sends.

PCS uses constellation points with higher amplitude less frequently than those with lesser amplitude to transmit signals since lesser amplitude signals are more resilient to noise and other distortion sources. For example, PCS in optical transport systems can achieve a higher transmission capability over a given channel to improve the spectral efficiency of optical communications. Optimizing the PCS of constellation points can permit transmission operations closer to a channel's Shannon limit (that is, the theoretical maximum information transfer rate of a channel for a particular noise level) as compared to traditionally unshaped constellations. For comparison, a shaped 64-QAM, used at the same rate as a conventional 16-QAM constellation, can yield a 1 decibel (dB) signal-to-noise ratio (SNR) improvement, which is about a 25% reach increase.

In constellation shaping, "codewords" are selected to produce output modulation symbols. The codewords are selected to maximize the use of lower power symbols and minimize the use of higher power symbols with respect to the data bits to be transmitted. The net result is an overall reduction of transmit power compared to a scheme where the symbols are assigned to the modulation symbol alphabet without regard to the power level consumption.

Previous methods of constellation shaping implementations include "constant composition distribution matching" (CCDM) and "shell mapping." While technically feasible, CCDM is impractical because of the requirement for continuous calculation of probability values using floating point arithmetic. Shell mapping also suffers from increased complexity from both the modulation power and codeword length.

Unlike conventional constellation shaping algorithms that adopts an algorithmic approach to probabilistic generation of modulation symbols and subsequent complex-hardware implementation, the embodiments of the present disclosure for a virtual lookup table (LUT) take a hardware-centric approach that is similar to algorithmic performance of within a small fraction of a decibel in required signal-to-noise ratio (SNR) to complex PCS techniques including CCDM and shell mapping. In a hardware-centric approach, input bits are mapped to output symbols as codeword combinations that do not require storage in a lookup table. Instead, the codeword combinations are generated on-the-fly-as a virtual LUT. Conventional constellation shaping algorithms may, in contrast, require prohibitively large lookup tables or hardware-based floating point arithmetic operations to produce codeword combinations for PCS.

While the use of a larger modulation symbol alphabet allows a denser modulated signal, it necessarily requires the use of higher power levels which may introduce errors into the modulated signal. This makes it more difficult to distinguish modulation symbols associated with higher power levels. This can lead to slower net throughput if it becomes necessary to resend messages that contain errors.

Embodiments of the present disclosure are modulation format independent. Hardware implementation does not need to be changed to accommodate higher power modulation schemes. Thus, implementation does not depend on the modulation symbol alphabet, but only on codeword length. Also, unlike conventional constellation shaping algorithms, embodiments of the present disclosure entail a lower complexity for the decoder compared to the encoder, hence, resulting in further reduction of overall complexity compared to legacy schemes.

FIG. 1 shows the overall architecture 100 implemented at the transmitter for probabilistic shaping of constellation symbols An information source device that operates to produce and/or provide video data, audio data, multimedia data, etc., may provide data bits including both distribution matching (DM) bits 102 and non-DM bits 104. As may be appreciated, DM is a fixed-length invertible mapping from a uniformly distributed bit sequence to produce shaped amplitudes and as such plays a role in the probabilistic amplitude shaping frameworks. The DM bits 102 include a non-desirable distribution that is not desirable. For example, the DM bits 102 may include a distribution that is more or less uniform, or arbitrary, with respect to one another. Such a uniform and/or arbitrary distribution does not yield an optimized use of a power modulation alphabet to maximize a throughput for an available channel. The DM bits 102 can be divided or parsed by various algorithms or functions. As an example, a floor( ) function can be used to divide the DM bits 102 to into different power modulation groupings for mapping by the DM mapper 106. As may be appreciated, distribution matching transforms a binary data sequence, or blocks of data bits, into a sequence of symbols with a desired distribution.

The mapping by the DM mapper 106 is configured in a one-to-one mapping between the input and the output to operate as a virtual lookup table (LUT). The DM mapper 106 operates as a hardware-based combinatorial machine to generate codewords for distribution matching, where a distribution codeword location of each modulation symbol, such as $\{1, 3, 5, \ldots\}$ in an output vector A or codeword 108 is performed through a hardware-combination efficient generator; determining. The DM bits 102 pass through DM mapper 106 to produce codeword 108 comprising N modulation symbols $110_1$-$110_N$ from a modulation symbol alphabet. For example, the modulation symbol alphabet for a 16 quadrature amplitude modulation (QAM) modulator is $\{\pm 1, \pm 3\}$ (4 bits per symbol), for 36-QAM modulator the modulation symbol alphabet is $\{\pm 1, \pm 3, \pm 5\}$ (6 bits per symbol), for 64-QAM modulator the modulation symbol alphabet is $\{\pm 1, \pm 3, \pm 5, \pm 7\}$ (6 bits per symbol), and so on; there are no limits to the modulation formats (and hence the modulation symbol alphabets) to which the embodiments of the present disclosure may be applied. In a 36-QAM modulator context, the number of power modulation levels are limited, which limits the potential throughput rate. In the 36-QAM context, additional power modulation levels are available for greater throughput.

In this respect, the modulation symbol alphabet can be expressed as symbols $110_1$-$110_N$, which are converted to bits by forward error correction (FEC) Amplitude Labeling 114, and then further encoded along with non-DM data bits using an FEC code by FEC 116. The output of the FEC 116 are binary bits that are used by sign calculation 120 to determine the modulation symbols produced by the DM mapper 106 for transmission. For example, N modulation symbols $110_1$-$110_N$ are multiplied with the FEC 116 output multiplied ("X") via the sign calculation 120 to produce signed modulation symbols $118_1$-$118_N$.

Note that in this embodiment, the implementation is independently implemented for the I and Q branches. For example, codeword 108 is a collection of real modulation symbols $110_1$-$110_N$ with no sign. The assignment of the sign to the modulation symbols $110_1$-$110_N$ of codeword 108 and the merger of the I (in-phase) and Q (quadrature) branches into a complex codeword, and is performed after the mapping process by the DM mapper 106. However, embodiments are not so limited and can be modified to process the I and Q branches jointly, and the codeword output may be a vector of complex numbers.

Figure 2:
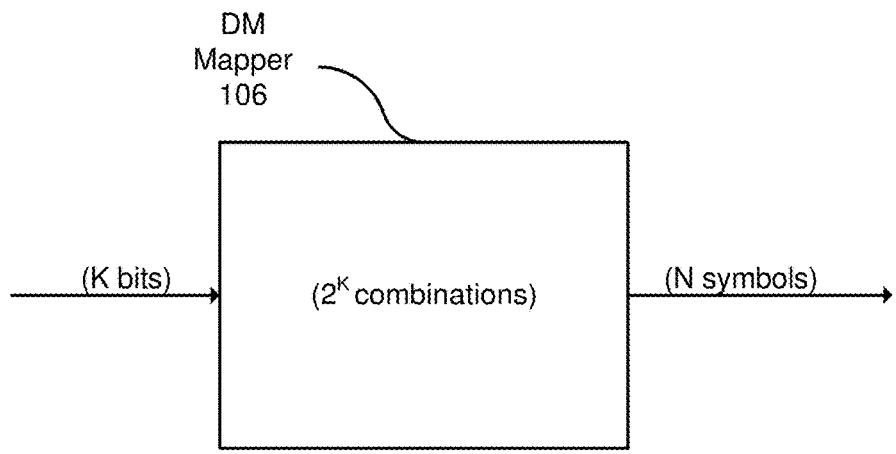
FIG. 2 shows a mapper for mapping input bits into output symbols in an embodiment of the present disclosure.

FIG. 2 shows is an isolated view of DM mapper 106. As suggested, there are $2^K$ combinations for mapping from K input bits (DM bits 102) to the N modulation symbols $110_1$-$110_N$. Note that unlike conventional systems, embodiments of DM mapper 106 do not require that any of N modulation symbols $110_1$-$110_N$ be physically stored in memory. Instead, embodiments of the present disclosure consider these entries as combinations of symbols that are generated on-the-fly in hardware, which is configured as a virtual lookup table (LUT), for each input bit combination.

Here, the number N of modulation symbols $110_1$-$110_N$ in codeword 108 depends on the modulation format. For example:

$N=N_1+N_3+N_5+N_7$(64-QAM symbol alphabet $\{1, 3, 5, 7\}$)
$N=N_1+N_3+N_5$(36-QAM symbol alphabet $\{1, 3, 5\}$)
$N=N_1+N_3$(16-QAM symbol alphabet $\{1, 3\}$)

Where N is the number of modulation symbols, $N_1$ is the number of level 1 modulation symbols, $N_3$ is the number of level 3 modulation symbols, $N_5$ is the number of level 5 modulation symbols, $N_7$ is the number of level 7 modulation symbols, etc. As may be appreciated, a modulation symbol alphabet may continue as a series of odd numbers, even numbers, or a hybrid series of numbers representing further QAM modulation patterns (such as 256-QAM, 1024-QAM, etc.), that can be represented by the series expression $\Sigma_{x=0}^{\infty} N_{(2x+1)}$. An example of an odd number modulation symbol alphabet can be $\{1, 3, 5, 7, \ldots\}$. An example of an even number modulation symbol alphabet can be $\{2, 4, 6, 8, \ldots\}$. Also, based upon design and/or channel characteristics, customary lower power level modulation symbols can be omitted. Examples of such modulation symbol alphabets can include $\{4, 6, 8, \ldots\}$, $\{3, 5, 7, \ldots\}$, etc.

Generation of the N modulation symbols $110_1$-$110_N$ forming codeword 108 can be performed sequentially. For example, for 64-QAM modulation, the location of $N_1$ symbols within a codeword 108 of length N is first determined. Next, the location of $N_3$ symbols within a remaining length of $N-N_1$ symbols is determined. Next, the location of $N_5$ symbols within the $N-N_1-N_3$ symbols codeword 108 is determined. Finally, the unfilled positions within codeword 108 are filled with symbol 7 of length $N_7$. For 36-QAM, locations of $N_1$ "1" symbols and $N_3$ "3" symbols of codeword 108 are determined and the remaining $N-N_1-N_3$ locations are filled with $N_5$ "5" symbols. For 16-QAM, locations of only $N_1$ "1" symbols are determined and the remaining $N-N_1$ symbols of codeword 108 are filled with $N_3$ "3" symbols.

The choice of $N_1$, $N_3$, $N_5$ and $N_7$ is such that there are sufficient number of output codewords to represent all combinations of K input bits according to the following:

$$\text{floor}(\log_2 C_{N1}^N) + \text{floor}(\log_2 C_{N3}^{N-N1}) + \text{floor}(\log_2 C_{N5}^{N-N1-N3}) \geq K \quad \text{(64-QAM)}$$

$$\text{floor}(\log_2 C_{N1}^N) + \text{floor}(\log_2 C_{N3}^{N-N1}) \geq K \quad \text{(36-QAM)}$$

$$\text{floor}(\log_2 C_{N1}^N) \geq K \quad \text{(16-QAM)}$$

where floor( ) function represents rounding down to a nearest integer. C is the combination of a subset of values from a larger set of values. For example, $C_{N1}^N$ represents the number of combinations of a modulation subset $N_1$ from a larger modulation set of N values or codeword symbol length.

Figure 3:
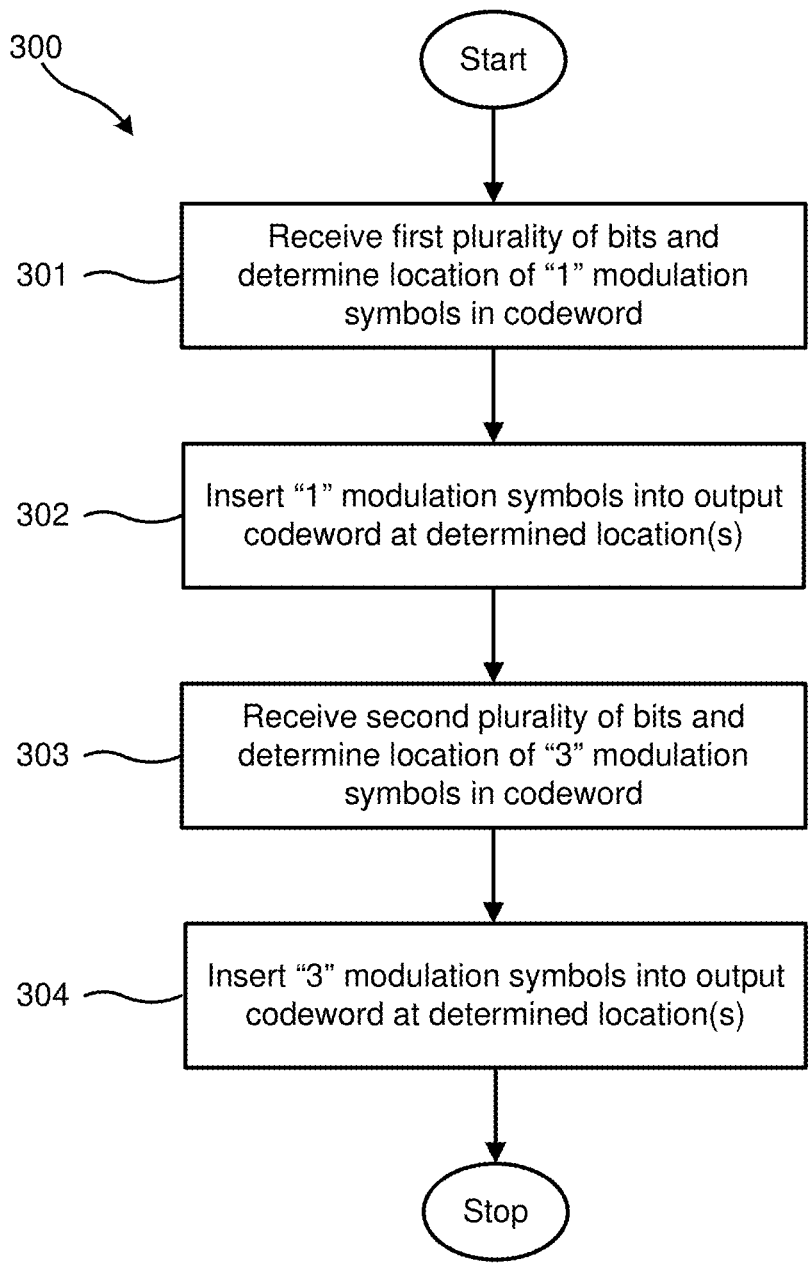
FIG. 3 shows a high-level flowchart for virtual lookup table (LUT) codeword generation as a combination of modulation symbols in an embodiment of the present disclosure.

Once the modulation symbol lengths from $N_1$, $N_3$, $N_5$ and $N_7$ satisfying the above condition is made, the encoding process includes partitioning or dividing the K bit input of DM bits 102 into $B_1$, $B_2$, and $B_3$ bit sets to maximize the use of lower power symbols and minimize the use of higher power symbols, such that:

$$2^K = 2^{B_1} \times 2^{B_2} \times 2^{B_3} \quad \text{(64-QAM)}$$

$$K = B_1 + B_2 + B_3$$

$$2^K = 2^{B_1} \times 2^{B_2} \quad \text{(36-QAM)}$$

$$K = B_1 + B_2$$

$$2^K = 2^{B_1} \quad \text{(16-QAM)}$$

$$K = B_1$$

Where the integer number for each bit set of the present example are:

$B_1 = \text{floor}(\log_2 C_{N1}^N)$
$B_2 = \text{floor}(\log_2 C_{N3}^{N-N1})$
$B_3 = \text{floor}(\log_2 C_{N5}^{N-N1-N3})$ FIG. 3 shows a high-level flowchart 300 describing the process of probabilistically generating a plurality of modulation symbols for an output codeword that maximizes lower power symbols and minimizes higher power symbols in an embodiment of the present disclosure. In operation 301, a first plurality of bits are received and the locations of the lowest-power modulation symbols (the "1" modulation symbols) are determined. In operation 302, the "1" modulation symbols are inserted into the codeword at the determined location(s). In operations 303 and 304, the operations are repeated for the "3" modulation symbols.

Figure 4:
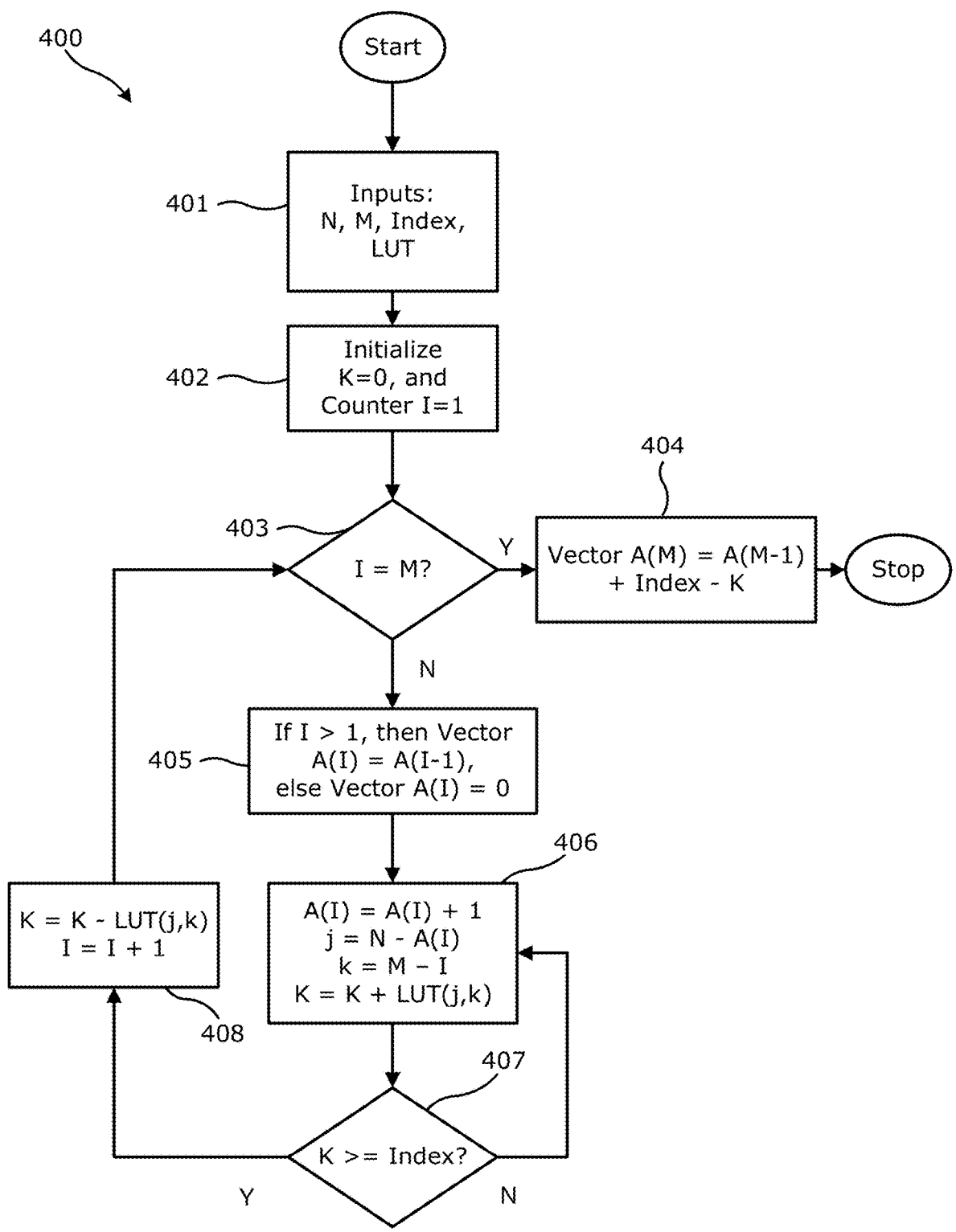
FIG. 4 shows a detailed flowchart for virtual LUT codeword generation as a combination of modulation symbols in an embodiment of the present disclosure.

FIG. 4 shows a detailed flowchart 400 of the mapping process in an embodiment of the present disclosure. Flowchart 400 may be used to implement the operations of flowchart 300. N, A Index and LUT are inputs to flowchart 400 as shown in operation 401, where M is the same as $N_1$ and LUT is a two-dimensional (2D) lookup table including certain functional integer values for encoding outputs for corresponding inputs. The integer values of the 2D LUT are static and represent integer numbers that equal the total number of combinations given by $C_K^N$ for different values of N and K.

In operation 402, indexes K and I are initialized to 0 and 1 respectively. In operation 403, the current value of I is compared to M. When I and M are equal to one another, then the $M^{th}$ entry of vector A is set in operation 404 and processing ends. When I is not equal to M, then according to operation 405, when I is greater than 1, then the $I^{th}$ entry of vector A is set to the previous entry of vector A. Else, when I is less than or equal to 1 then the $I^{th}$ entry of vector A is set to zero.

In operation 406, the $I^{th}$ entry of vector A is incremented and values for j and k are calculated, where j is equal to N−A(I), and k is the decremented value of M (that is, M−I). The value of K is updated according to the value of LUT(j,k). In operation 407, if K is greater than or equal to Index, then in operation 408 K is recalculated, I is incremented, and processing continues at operation 403; otherwise operation 406 is repeated. Upon completion of the mapping process of flowchart 400, the vector A represents a codeword 108.

Figure 5:
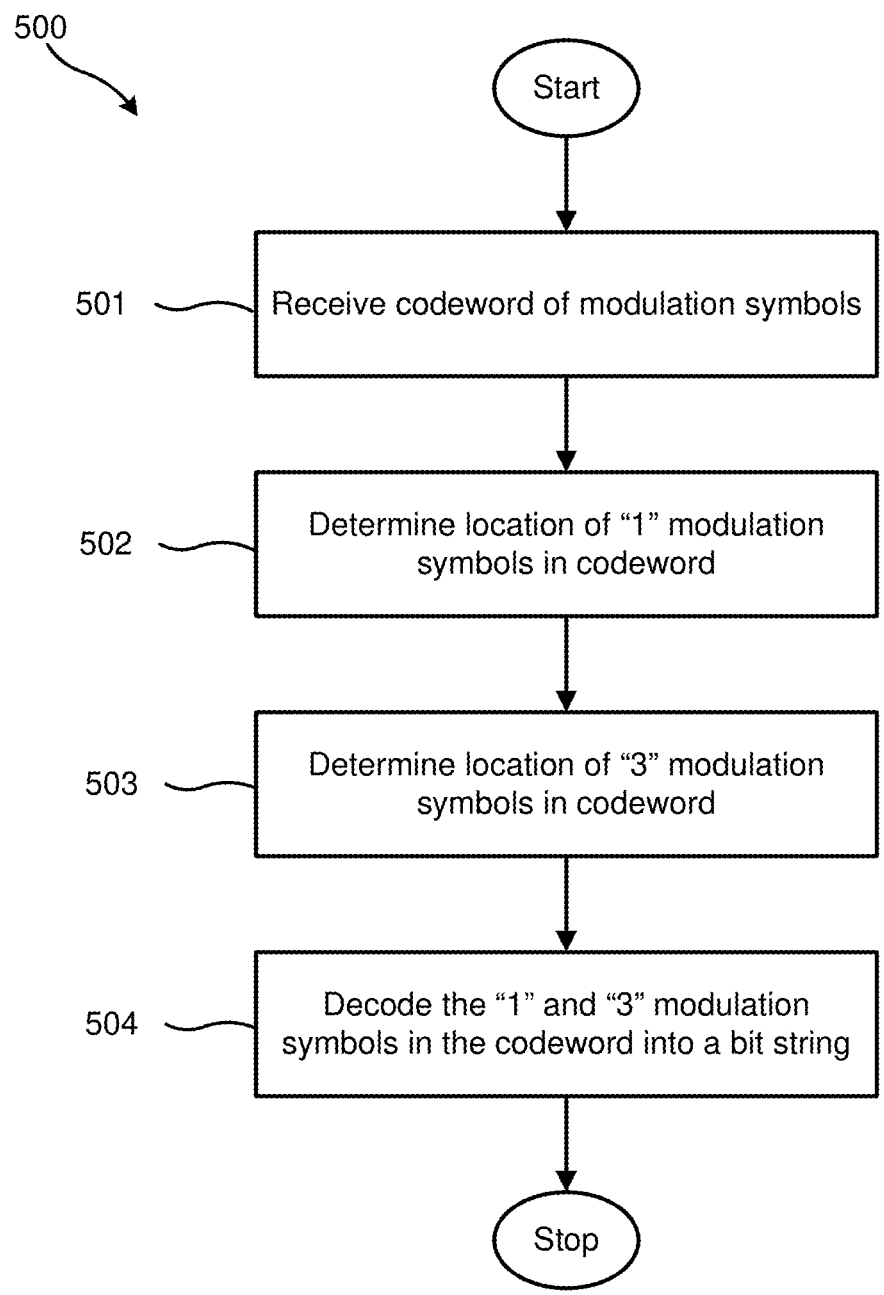
FIG. 5 shows a high-level flowchart for virtual LUT codeword decoding from symbol combinations to bits.

FIG. 5 shows a high-level flowchart 500 for decoding a block of modulation symbols that maximizes lower power symbols and minimizes higher power symbols to generate a block of corresponding bits. The bits may have been created using the operations of flowcharts 300 and 400. In operation 501, a codeword has been received; the codeword comprises a string of "1" and "3" modulation symbols (that is, the modulation symbols for power levels 1 and 3). In operation 502, the location of the "1" modulation symbols is determined, and in operation 503, the location of the "3" modulation symbols is determined. In operation 504, the codeword is decoded according to the location(s) of the modulation symbols to create the corresponding bit string.

Figure 6:
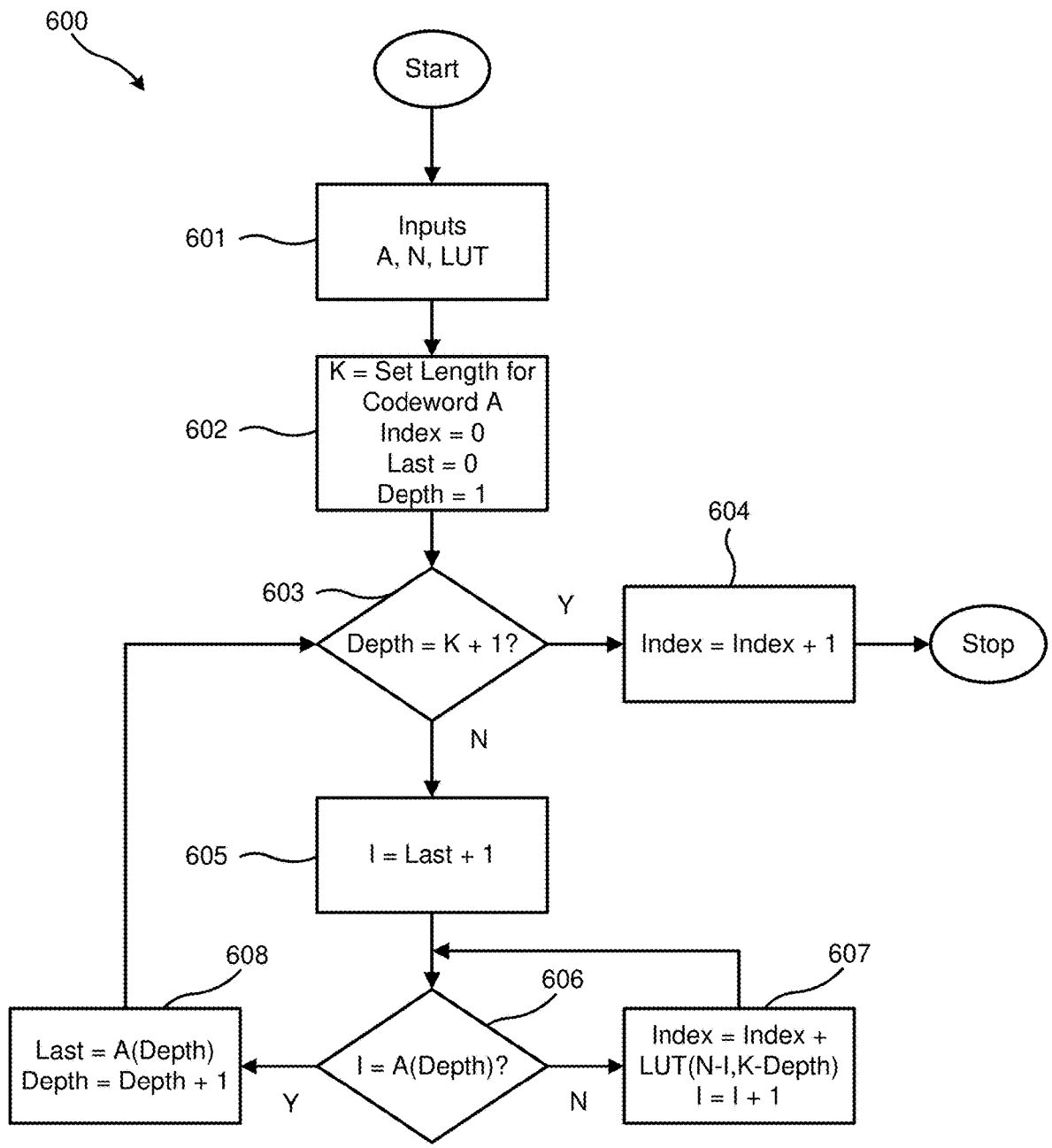
FIG. 6 shows a detailed flowchart for virtual LUT codeword decoding from symbol combinations to bits.

FIG. 6 shows a detailed flowchart 600 of an embodiment of the present disclosure suitable for decoding a block of N modulation symbols and generating a block of K bits, where K is the set length for the codeword 108, represented as variable A received via a communication channel and/or network path. The variable A in the decoder flowchart of FIG. 6 is a sequence of locations of the specific modulation symbol being decoded, for example, a symbol sequence of {1, 3, 5, . . . } encoded by the DM mapper 106. Flowchart 600 may be used to implement the operations of flowchart 500. Variables A, N, and LUT are inputs to flowchart 600 as shown in operation 601. Variable A, which is the length of the received codeword 108 of FIG. 1, is the sequence of locations of symbol "1". Variable N is the number of modulation symbols in the block. Variable LUT is a two-dimensional (2D) lookup table as in flowchart 400. Note that if the hardware implementation permits, the LUT may be shared for an encoder and decoder (or CODEC); however, if sharing the LUT is not possible, then the decoder LUT can be a smaller subset of the encoder LUT.

In operation 602, variable indices K, Index, and Last are initialized to 0, and Depth is initialized to 1. Index K is initialized to the length of codeword A, which is also referred to as the vector A. In operation 603, the current value of Depth is compared to K+1. If Depth is not yet equal to K+1, then I is set to Last+1 in operation 605. In operation 606, I is compared to the symbol A at Depth; if not equal, then at operation 607 Index and I are recalculated, I is recalculated at operation 605, and I is retested at operation 606 until I and the symbol A at Depth are equal at operation 606. In operation 608, Last is set to symbol A at Depth and Depth is incremented. The process repeats at step 603 until Depth is equal to K+1. At this point, locations of all "1" symbols in the codeword have been determined and at operation 604, the ending value of Index is an integer value whose bit representation corresponds to the first $B_1$ bits of the output. Decoding occurs sequentially for the remaining symbols; however, the variable A is understood to vary with the codeword 108 generated by the DM mapper 106. For example, the sequence of locations can change for each power symbol level. Subsequent subset of bits can have a different number of first level power symbols, a second level of power symbols, etc. Accordingly, operations 603-608 are repeated to identify the locations of all "3" power symbols within the remaining $N-N_1$ set of symbols, with the bit representation of the ending value of Index corresponding to the next $B_2$ bits of the output. Operations 603-608 are again repeated to identify the locations of all "5" power symbols within the remaining $N-N_1-N_3$ symbols of the received codeword 108 with the ending value of Index corresponding to the next $B_3$ bits of the output.

One of ordinary skill will recognize that flowcharts 300 through 600 are exemplary, and may be modified in the ordinary course of routine engineering. By way of example and not limitation, the operations of flowcharts may be modified to accommodate any modulation format. Further, the ordering of the operations may be modified so long as the end results of the flowcharts are not changed. Further, additional operations may be added for achieving other purposes associated with the general purpose of the flowcharts, or the operations of the flowcharts may be integrated with other operations associated with the functionality of a receiver, transmitter, or modulator. Further, the flowcharts may be modified for modulation symbols of additional power levels.

Figure 7:
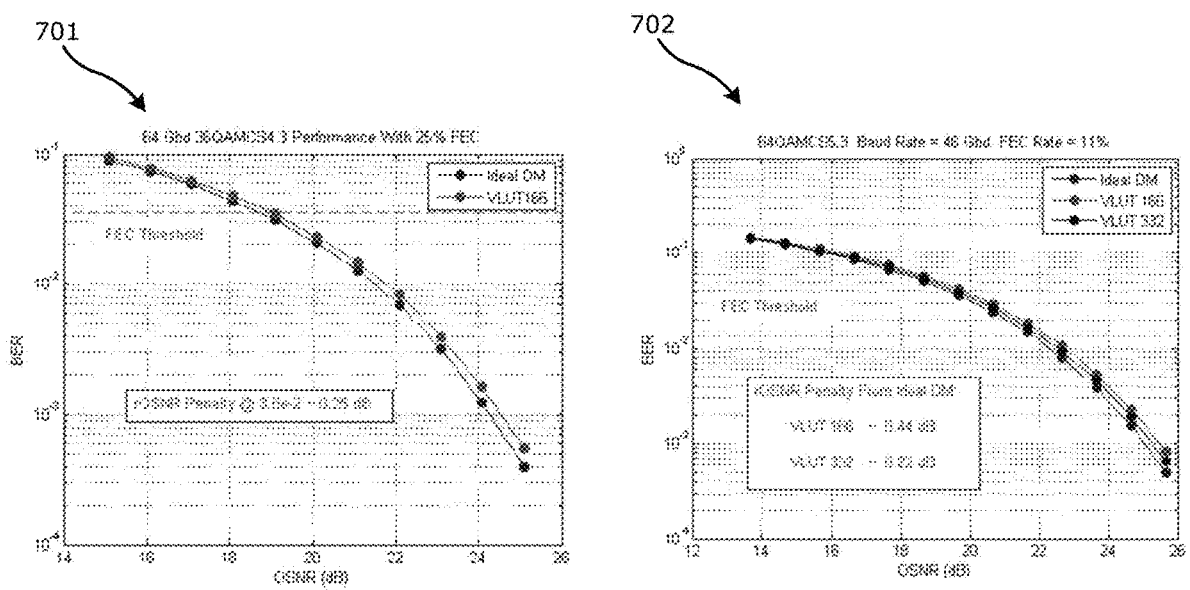
FIG. 7 shows a performance comparison between ideal distribution matching and distribution matching according to an embodiment of the present disclosure.

FIG. 7 shows the performance comparison between distribution matching using Ideal Gaussian distribution and that generated using the virtual VLUT. As can be observed from the plots, as the block length increases, the performance of a practical DM method based on virtual LUT approaches that of ideal DM. Chart 701 shows the performance for a 36-QAM format with a 25% FEC and chart 702 shows the performance for a 64-QAM format with a 11% FEC.

Figure 8:
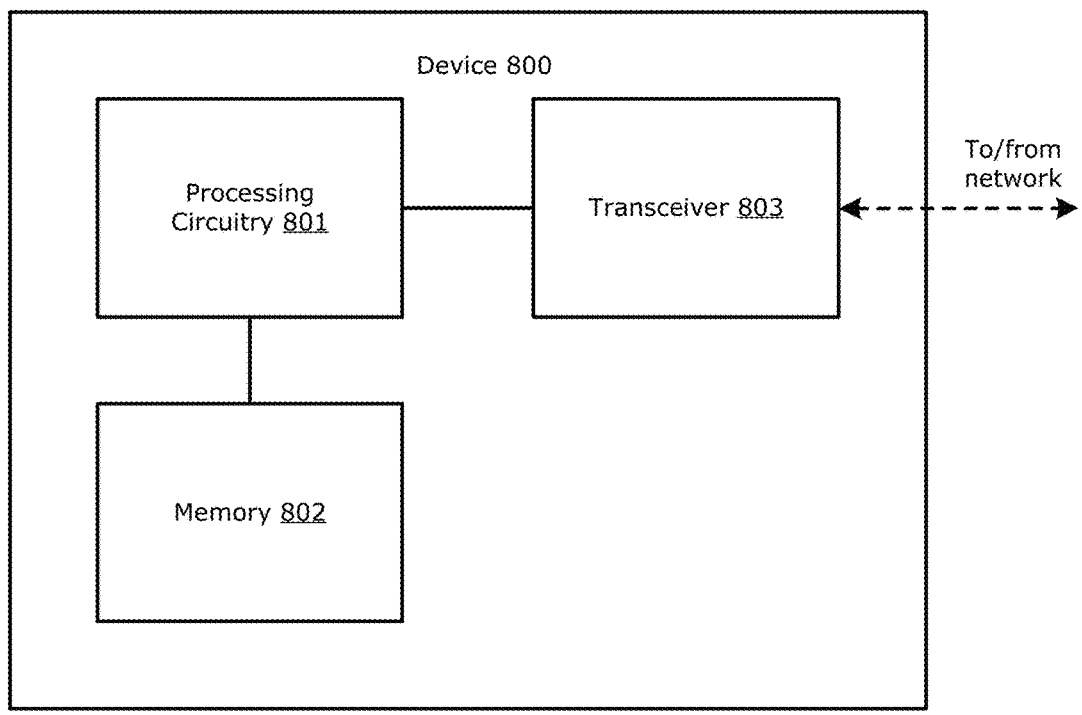
FIG. 8 shows an apparatus suitable for implementation of embodiments of the present disclosure.

FIG. 8 is a block diagram of a device 800 suitable for performing embodiments of the present disclosure. Device 800 comprises processing circuitry 801, memory 802, and transceiver 803. Processing circuitry 801 may comprise an application specific integrated circuit, field-programmable gate array, special or general purpose processor, or any other circuit(s) capable of executing the operations required for the embodiments of the present disclosure. Memory 802 may be integrated into the same circuitry as processing circuitry 801 or it may be any other circuitry capable of meeting the short and long term storage needs required for the embodiments of the present disclosure. Transceiver 803 may be any circuitry necessary for interfacing with an external optical, wireless, or wired network, including modulators, receivers, and other components as would be known to one of ordinary skill.

Thus disclosed herein is a method and apparatus for probabilistic generation of modulation symbols, including a means for receiving a first plurality of bits, a means for determining the locations of a plurality of "1" modulation symbols for an output codeword, a means for inserting the "1" modulation symbols into the output codeword, a means for receiving a second plurality of bits, a means for determining the locations of a plurality of "3" modulation symbols for the output codeword, and a means for inserting the "3" modulation symbols into the output codeword. Further disclosed herein is a method and apparatus for decoding a block of modulation symbols, including a means for receiving a codeword, the codeword comprising a plurality of modulation symbols, and the modulation symbols comprising symbols of a modulation symbol alphabet, a means for determining the location of "1" modulation symbols in the codeword, a means for determining the location of "3" modulation symbols in the codeword, and a means for decoding the "1" and "3" modulation symbols into a bit string.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A method for probabilistic generation of modulation symbols implemented by processing circuitry, the method comprising:
   receiving, from an information source device, a plurality of bits having an arbitrary distribution;
   partitioning the plurality of bits into a plurality of bit sets based on a symbol length of a codeword and a modulation constellation defined by a modulation symbol alphabet;
   mapping a first bit set of the plurality of bit sets based on a first power symbol of the modulation symbol alphabet to produce a plurality of first modulation symbols;
   populating an output codeword at a plurality of first codeword locations with the plurality of first modulation symbols;
   mapping a second bit set of the plurality of bit sets based on a second power symbol of the modulation symbol alphabet to produce a plurality of second modulation symbols;
   populating a plurality of remaining codeword locations with the plurality of second modulation symbols; and
   providing the output codeword for transmission.

2. The method of claim 1, wherein the symbol length for the codeword is based on a floor determination for each of a plurality of modulation-type sequences.

3. The method of claim 1, wherein the first power symbol is a lower power modulation symbol and the second power symbol is a higher power modulation symbol relative to the lower power modulation symbol.

4. The method of claim 1, wherein the plurality of first modulation symbols and the plurality of second modulation symbols are real values and the codeword relates to an in-phase branch of an in-phase/quadrature modulator.

5. The method of claim 1, wherein the plurality of first modulation symbols and the plurality of second modulation symbols are real values and the codeword relates to a quadrature branch of an in-phase/quadrature modulator.

6. The method of claim 1, wherein the plurality of first modulation symbols and the plurality of second modulation symbols are complex values and the codeword relates to an in-phase branch and a quadrature branch of an in-phase/quadrature modulator.

7. The method of claim 1, wherein the plurality of bits are generated by the information source device.

8. An apparatus for a virtual lookup table for probabilistic generation of modulation symbols, the apparatus comprising:
   processor circuitry configured to:
      receive, from an information source device, a plurality of bits having an arbitrary distribution;

partition the plurality of bits into a plurality of bit sets based on a symbol length of a codeword and a modulation constellation defined by a modulation symbol alphabet;

map a first bit set of the plurality of bit sets based on a first power symbol of the modulation symbol alphabet to produce a plurality of first modulation symbols;

populate an output codeword at a plurality of first codeword locations with the plurality of first modulation symbols;

map a second bit set of the plurality of bit sets based on a second power symbol of the modulation symbol alphabet to produce a plurality of second modulation symbols;

populate a plurality of remaining codeword locations with the plurality of second modulation symbols; and provide the output codeword for transmission.

9. The apparatus of claim 8, wherein the symbol length for the codeword is based on a floor determination for each of a plurality of modulation-type sequences.

10. The apparatus of claim 8, wherein the first power symbol is a lower power modulation symbol and the second power symbol is a higher power modulation symbol relative to the lower power modulation symbol.

11. The apparatus of claim 8, wherein the plurality of first modulation symbols and the plurality of second modulation symbols are real values and the codeword relates to an in-phase branch of an in-phase/quadrature modulator.

12. The apparatus of claim 8, wherein the plurality of first modulation symbols and the plurality of second modulation symbols are real values and the codeword relates to a quadrature branch of an in-phase/quadrature modulator.

13. The apparatus of claim 8, wherein the plurality of first modulation symbols and the plurality of second modulation symbols are complex values and the codeword relates to an in-phase branch and a quadrature branch of an in-phase/quadrature modulator.

14. The apparatus of claim 8, wherein the plurality of bits are provided by the information source device.

15. The apparatus of claim 8, wherein the processor circuitry is further configured to provide the output codeword for transmission with forward error correction (FEC).

16. A method for decoding a block of modulation symbols, comprising:

receiving a codeword, the codeword including a plurality of codeword locations populated by a plurality of modulation symbols based on a plurality of modulation symbol alphabets;

determining a first plurality of codeword locations for a first plurality of modulation symbols based on a first one of the plurality of modulation symbol alphabets for lower power modulation symbols;

determining a second plurality of codeword locations for a second plurality of modulation symbols based on a second one of the plurality of modulation symbol alphabets for higher power modulation symbols relative to the lower power modulation symbols for the first one of the plurality of modulation symbol alphabets; and decoding the first plurality of modulation symbols and the second plurality of modulation symbols to produce a bit string.

17. The method of claim 16, wherein the plurality of modulation symbols are real values and the codeword relates to an in-phase branch of an in-phase/quadrature modulator.

18. The method of claim 16, wherein the plurality of modulation symbols are real values and the codeword relates to a quadrature branch of an in-phase/quadrature modulator.

19. The method of claim 16, wherein the plurality of modulation symbols are complex values and the codeword relates to an in-phase branch and a quadrature branch of an in-phase/quadrature modulator.

* * * * *